Oct. 13, 1936.   D. H. GOODWILLIE   2,057,569
APPARATUS FOR USE IN CASE HARDENING OF GLASS SHEETS
Filed July 16, 1934   2 Sheets-Sheet 1
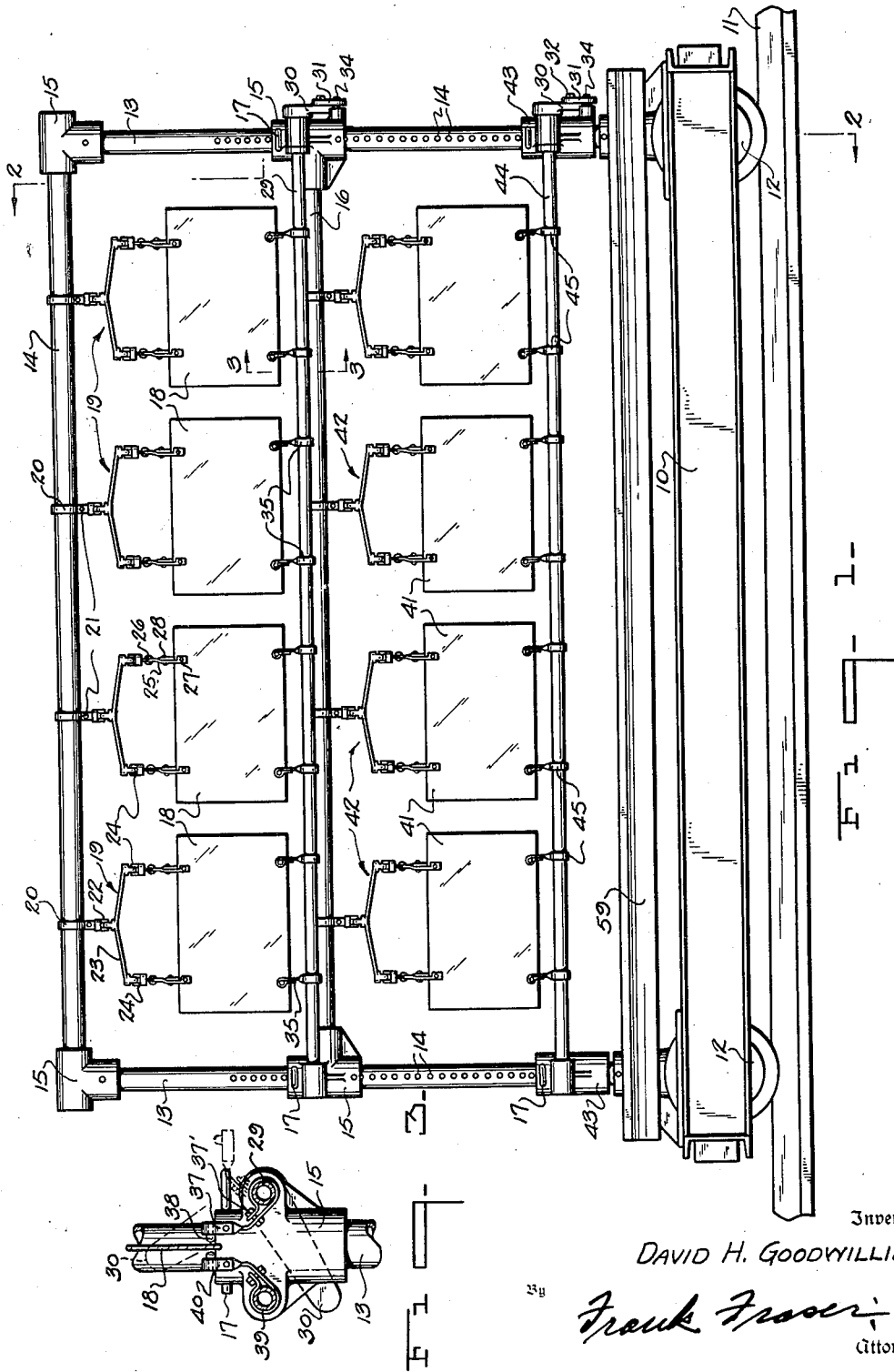
Inventor
DAVID H. GOODWILLIE.
By Frank Fraser
Attorney Oct. 13, 1936.   D. H. GOODWILLIE   2,057,569
APPARATUS FOR USE IN CASE HARDENING OF GLASS SHEETS
Filed July 16, 1934   2 Sheets-Sheet 2
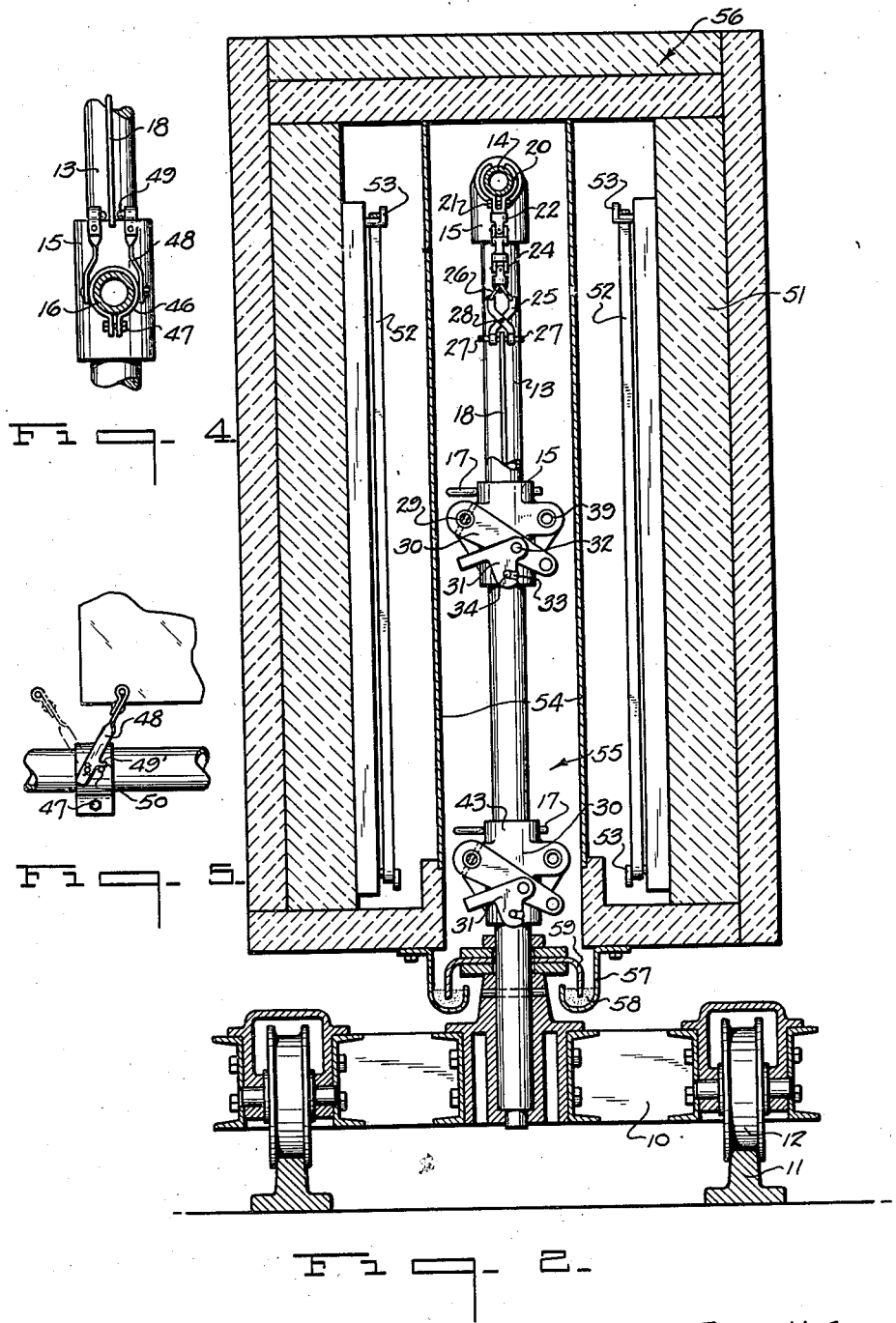
Inventor
DAVID H. GOODWILLIE.
By Frank Fraser
Attorney Patented Oct. 13, 1936

2,057,569

UNITED STATES PATENT OFFICE 2,057,569

APPARATUS FOR USE IN CASE HARDENING OF GLASS SHEETS

David H. Goodwillie, Toledo, Ohio, assignor to Libbey-Owens-Ford Glass Company, Toledo, Ohio, a corporation of Ohio Application July 16, 1934, Serial No. 735,406

14 Claims. (Cl. 49—45)

The present invention relates to an apparatus for use in the case hardening of glass sheets and more particularly to means for supporting and conveying the glass sheets during the case hardening treatment.

Case hardened glass is a glass which has been heated to approximately its point of softening and then rapidly chilled to place the outer surfaces thereof under compressioin and the interior of the sheet under tension. Such treatment renders the glass much more resistant to breakage by greatly increasing its mechanical strength and also the breaking characteristics of the glass are materially changed so that instead of breaking into relatively large dangerous pieces of glass, when broken, it disintegrates into innumerable fragments, each small, which in themselves are relatively harmless.

I have found that due to the fact that the glass must be heated to approximately its point of softening, great care should be exercised in the supporting and handling of the glass to prevent buckling or warping and also to permit substantially uniform treatment of the glass sheet throughout its entire area. It will be understood that the absence from distortion of the sheet with regard to its planity is of utmost importance when it is considered that the glass must be accurately shaped and sized prior to the case hardening treatment because after treatment it is impossible to surface the glass, cut it, or otherwise change its shape or size without breaking it.

Broadly speaking, the invention embodies the use of a supporting means in which one or any number of sheets of glass may be supported in a vertical position in such a way that each sheet will seek its own level, so to speak, thus reducing to a minimum the tendency towards distortions, warpage, and other undesirable conditions. By employing this apparatus, one or any number of sheets of glass may be supported on a carrier and simultaneously heated and then quenched to effect the case hardening thereof.

In the drawings wherein like numerals are employed to designate like parts throughout the same, Fig. 1 is a side elevation showing a carrier provided with a plurality of supporting and restraining devices by which the glass sheets may be hung in a vertical position with side sway being restricted within definite limits.

Fig. 2 is a transverse vertical section taken on line 2—2 in Fig. 1,

Fig. 3 is a section taken on line 3—3 in Fig. 1,

Fig. 4 is a detail of a slightly modified form of restraining means, and

Fig. 5 is an elevation thereof.

In the production of case hardened glass, the glass sheet is preferably supported vertically, heated to approximately its point of softening which ordinarily is in the neighborhood of 1250° F. for the usual types of flat glass and, after the sheet has been heated uniformly to this temperature, it is suddenly chilled as by directing blasts or jets of air on the opposite surfaces of the heated glass. It is customary to first place the glass in a furnace for the heating operation and to then withdraw the glass from the furnace and position it between the cooling devices. It will be apparent that movement of the soft glass from the heating to the cooling devices introduces the hazard of shaking the glass and because of its softened condition, the planity of the sheet may be permanently destroyed. It will also be appreciated that the glass may be so hung during the heating that its own weight coupled with improper hanging will result in an undesirable straining of the glass which will produce distortion therein.

While in the past it has been generally customary to treat a single sheet of glass at a time, such a method of treatment does not lend itself to commercial production on a large scale. The present invention also embodies an apparatus capable of supporting a plurality of glass sheets so that a number of sheets of glass can be simultaneously case hardened with satisfactory results.

In the drawings, the numeral 10 designates a truck which can be moved on the rails 11 by virtue of the wheels 12. While in the particular example shown, the truck is provided with wheels adapted to run on a track, it will be understood that I also have in mind the operation of a truck designed to run on a series of fixed rotatable rolls.

Carried by the truck 10 is a pair of vertical standards 13 connected at their upper end by the cross member 14 by means of the joint 15. As the glass carrier is subjected alternately to heated and cooled conditions, it is preferred that the various parts of the carrier and truck be provided with relatively loose joints to permit of a certain amount of expansion and contraction of the parts without deleterious effects.

The vertical standards 13 are provided with the series of apertures 14 and the vertically slidable sleeve members 15, one on each standard, adapted to support the horizontally disposed cross member 16. The sleeves 15 are vertically adjustable and are held in position by means of pins 17 extending therethrough, which pins likewise extend through the selected openings 14 whereby the cross member 16 can be moved up and down with respect to the upper cross member 14.

The sheets of glass 18 are suspended from the upper cross member 14 by means of the devices 19. Each of the devices 19 includes a strap clamp 20 adapted to engage the cross member 14 and to be held in the preferred position by tightening the bolt 21 which clamps the bifurcated portions of the clamp about the cross member. Hanging downwardly from and carried by the clamp is a universal joint 22 which in turn carries the spreader 23 carrying at each end the universals 24. Each of the universals 24 carries a tong device 25 shown clearly in Fig. 2, which tong device is supported on the universal 24 by means of the links 26. The tongs carry the horizontally disposed adjustable screws 27 provided with pointed inner ends adapted to engage the sheet of glass 18 to be treated near its upper edge. By reason of the pivot 28, it will be seen that the weight of the sheet causes the tongs to firmly grip the same and for purposes of stability, two tongs are used to support a single sheet of glass.

The construction of the supporting device 19 is such that even though the sheet of glass be irregular in shape and even though the operator fails to accurately position the tongs with respect to the upper edge of the glass sheet, the sheet of glass will be capable of seeking its own level or, stated differently, to hang naturally in absence of any undue tendency towards distortion, buckling, or warping. By providing the main central universal 22 and the two universals 24 carried by the spreader arm 23 regardless of the association of the clamps with the glass and the size and shape of the glass, it will be supported properly.

To prevent undue swaying and to guarantee against rotation of the glass sheet because of the use of universal joints, restraining devices are provided to limit movement of the sheet so that it will at all times hang in a substantially vertical plane.

In Figs. 1, 2 and 3, one form of restraining device is illustrated in which the rod 29 is carried by the vertical adjustable sleeves 15. The rod is rotatably mounted and is provided at one end with the operating lever 30 keyed to the rod and the operating lever also carries the catch 31 which is pivotally associated therewith by means of the pin 32. The catch 31 is provided with the slot 33 adapted to engage the stationary pin 34 carried by the sleeve 15 so that when the arm is in the position shown in full lines in Fig. 2, the catch may be swung into position for engagement with the pin 34, thus preventing accidental rotation of the rod 29.

Mounted on the rod 29 are a number of restraining devices 35 which may comprise the strap metal clamp 36 securely fastened to the rod 29 by means of the bolt 37. The strap device terminates in the upstanding portion 37 carrying a knob or pad 38 preferably formed from a material such as asbestos which will not in any way injure the glass sheet during either the heating or cooling steps.

The full lines in Fig. 3 illustrate the restraining device when in restraining position which is the position assumed when the lever 30 is in the locked position shown in Fig. 2. When it is desired to remove the glass sheets, the lever 30, after the catch 31 has been disengaged from the pin 34, is swung upwardly which throws the restraining devices into the position shown in dotted lines in Fig. 3.

Also carried by the vertically adjustable sleeves 15 is a second rod 39 mounted parallel to the rod 29 and carrying the stationary restraining devices 40 similar in every respect to the restraining devices 35 except that there is no necessity for providing for movement thereof away from the glass sheets. It is preferred that the pads carried by the restraining devices, when in operative position, be spaced apart a distance slightly greater than the thickness of the glass sheet being treated so that the glass may be supported freely and out of contact with the restraining devices except at such times that there may be a tendency for the glass sheet to swing or sway. The slight movement of the sheet permitted by the restraining devices will not prove detrimental.

The cross member 16, like the member 14, is adapted to support a second row of glass sheets 41 by means of a second row of glass hangers 42 similar to the glass hanging devices 19.

The vertical standards 13 also carry the vertical adjustable slides 43 between which is mounted the rod 44 carrying the restraining devices 45. After the upper row of glass sheets 18 are mounted in position on the carriers 19, the vertically adjustable sleeves 15 are moved upwardly until the restraining devices are in proper position as has already been described. The second row of glass sheets 14 may then be suspended and the rod 44, by means of the sleeves 43, positioned to place the restraining devices carried thereby in operative association with the glass. The restraining devices 45 are operated in just the same manner as those carried on the rod 29.

While it is not absolutely necessary, it is preferred that glass of about the same size be placed in the same row to conserve space and to permit of the most advantageous use of the glass carrying frame as in this way a maximum of sheets may be treated at one time.

In Figs. 4 and 5 a slightly modified form of restraining device is shown wherein the rod 16, which is the same as the rod 44, is provided with the yoke 46 encircling the same and held in position by means of the clamp 47. The yoke has pivoted thereto the arms 48 carrying the pads 49. As shown in Fig. 5, the arms are provided with the offset portions 49' adapted to contact with the stationary pin 50 when in operative position. When the glass is to be removed, the arm is swung out of position as shown in dotted lines.

In Fig. 2, a form of furnace that can be employed is illustrated. The furnace 51 is provided with the electrical heating elements 52 carried by the insulators 53 and of course are connected to any suitable controlling and indicating devices so that the temperature of the furnace can be accurately controlled. The baffle walls 54 may be used, and it will be seen that they form a compartment 55 through which the glass sheets are moved when on the carrier. The top wall 56 coupled with the baffles 54 completely close the furnace on three sides. Closing or sealing of the bottom side is accomplished by providing the troughs 57 adapted to contain a quantity of sand or similar material 58. The glass carrier is provided with the downwardly extending flanges 59 which run through the sand in such a way as to create an effective seal to prevent not only the loss of heat from within the furnace but introduction of drafts thereinto.

With the apparatus illustrated and described, a plurality of sheets of glass are supported in such a way that they seek their own level; that is, by virtue of the supporting devices including the universal connections, the glass is free to hang naturally even though the operator fails to properly or accurately place the clamping devices thereon. In addition, any unevenness in the track system or distortion in the glass carrying frame itself will not adversely affect the glass sheets as all of these inaccuracies are compensated for by the hanging devices. Furthermore, the restraining members restrict possible movement of the glass sheets during movement thereof into and out of position and particularly when the rack of glass is transferred from the heating to the cooling means.

After the desired number of glass sheets have been placed in position on the carrier, the carrier may be rolled into a furnace, heated uniformly to bring the glass to a temperature at approximately the softening point thereof, after which the carrier may again be moved to bring the glass sheets into proper association with the cooling means. The cooling or quenching means are not illustrated as they do not constitute a part of the present invention. It is believed sufficient to state that any type of cooling means capable of rapidly acting upon the glass in a manner to place the surfaces thereof under compression and the interior of the glass under tension is contemplated.

After the cooling operation, the restraining devices can be quickly moved out of operative position and the glass released from the tong members by simply raising up on the glass as will be readily understood. While two rows of glass sheets have been illustrated, the number of rows of glass sheets that can be handled at one time will be dependent not only upon the size of the equipment but also upon the size of the glass sheets being treated. As a matter of fact, for purposes of illustration, the size of the hangers with respect to the size of glass being treated have been somewhat exaggerated.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for use in the case hardening of glass sheets comprising a movable frame, a universal mounting carried thereby, a glass sheet hanger suspended from the universal mounting, a plurality of glass gripping means carried by the hanger for supporting the glass sheet, and restraining means associated with the frame to restrict transverse movement of said glass sheet.

2. Apparatus for use in the case hardening of glass sheets comprising a movable frame, a universal mounting carried thereby, a spreader suspended from said universal mounting, a universal mounting carried by each end of said spreader, glass gripping means carried by each of said last-mentioned universal mountings for supporting the glass sheet, and restraining means associated with the frame to restrict transverse movement of the glass sheet.

3. Apparatus for use in the case hardening of glass sheets comprising a movable frame, a glass sheet hanger suspended therefrom, a plurality of spaced, freely movable glass gripping means carried by the hanger for supporting the glass sheet in a normally vertical plane, a plurality of pairs of restraining devices carried by the frame and between which the glass sheet is positioned, said restraining devices being mounted in spaced relation so that when the sheet is in its normal vertical position it is out of contact with said restraining devices.

4. Apparatus for use in the case hardening of glass sheets comprising a movable frame including a plurality of cross members disposed in a substantially horizontal plane, a plurality of glass suspending devices carried by the uppermost cross member, each of said glass suspending devices being connected to the cross member by means of a universal mounting so that each sheet of glass is free to seek its own level, and a plurality of means carried by another cross member for limiting transverse movement of the glass sheets with respect to said frame.

5. Apparatus for use in the case hardening of glass sheets comprising a movable frame, a universal mounting carried thereby, a spreader suspended from the universal mounting, a universal mounting carried by each end of said spreader, glass gripping means carried by each of the last-mentioned universal mountings for supporting the glass sheet, and vertically adjustable restraining means associated with the frame and adapted to be positioned in proximity to the lower edge of the glass sheet to restrict transverse movement thereof.

6. Apparatus for use in the case hardening of glass sheets comprising a truck, a pair of spaced standards carried thereby, a plurality of cross members mounted therebetween, a plurality of universal mountings carried by the uppermost cross member, a plurality of freely movable glass gripping devices suspended from each of said universal mountings, each of said universal mountings and associated parts being adapted to vertically suspend a sheet of glass, and a plurality of means carried by another of said cross members to restrict transverse movement of the glass sheets.

7. Apparatus for use in the case hardening of glass sheets comprising a truck, a pair of spaced standards carried thereby, a plurality of cross members mounted therebetween, a plurality of universal mountings carried by the uppermost cross member, a plurality of freely movable glass gripping devices suspended from each of said universal mountings, each of said universal mountings and associated parts being adapted to vertically suspend a sheet of glass, and a plurality of adjustable vertically movable restraining devices for restricting transverse movement of the glass sheets.

8. Apparatus for use in the case hardening of glass sheets comprising a movable frame, a floating glass sheet hanger suspended therefrom, a plurality of spaced glass gripping means carried by the hanger for supporting the glass sheet so that it will seek its own level, and restraining means associated with said frame to restrict the transverse movement of said glass sheet.

9. Apparatus for use in the case hardening of glass sheets comprising a movable frame, a glass sheet hanger suspended therefrom, a plurality of spaced, freely movable glass gripping means carried by the hanger for supporting the glass sheet in a normally vertical plane in a manner that it will seek its own level, and a pair of restraining devices associated with the frame and between which the glass sheet is adapted to be positioned so that transverse movement of the sheet is restricted to within predetermined limits.

10. Apparatus for use in the case hardening of glass sheets comprising a movable frame, a glass sheet hanger suspended therefrom, a plurality of glass gripping means carried by the hanger for supporting the glass sheets, restraining means associated with the frame to restrict transverse movement of the glass sheets, said restraining devices being mounted in spaced relation so that when the sheet is in its normal vertical position it is out of contact with said restraining devices, and means for vertically adjusting the said restraining means to properly position the same with respect to said sheet.

11. Apparatus for use in the case hardening of glass sheets comprising a movable frame, a floating glass sheet hanger suspended therefrom, a plurality of freely movable glass gripping means for supporting the glass sheet in a normally vertical plane so that each sheet of glass is free to seek its own level, and vertically adjustable restraining devices associated with the frame and adapted for positioning in proximity to the lower edge of the glass sheet to restrict transverse movement thereof.

12. Apparatus for use in the case hardening of glass sheets comprising a movable frame, including a cross member disposed in a substantially horizontal plane, a plurality of glass suspending devices carried by the cross member, a second cross member mounted beneath the first mentioned cross member and vertically adjustable with respect thereto, and restraining devices carried by said second mentioned cross member and being mounted in spaced relation so that when the sheet is in its normal vertical position it is out of contact therewith.

13. Apparatus for use in the case hardening of glass sheets comprising a movable frame including a floating cross member disposed in a substantially horizontal plane, a plurality of freely movable glass suspending devices carried by the cross member for holding the sheet so that it is free to seek its own level, a vertically adjustable second cross member mounted beneath the first mentioned cross member, and means carried by said second mentioned cross member adapted for positioning with respect to the glass sheets to restrict transverse movement thereof.

14. Apparatus for use in the case hardening of glass sheets comprising a truck, a pair of spaced standards carried thereby, a plurality of cross members mounted therebetween, glass suspending devices carried by the uppermost cross member, and means carried by another of said cross members and in spaced relation to one another for restricting transverse movement of the glass sheets but out of contact with said sheet when it is hanging in its normal vertical position.

DAVID H. GOODWILLIE.